US008850082B2

(12) United States Patent
Malamant et al.

(10) Patent No.: US 8,850,082 B2
(45) Date of Patent: Sep. 30, 2014

(54) VIRTUAL USB COMPOUND DEVICE ENUMERATION

(75) Inventors: Igor Malamant, San Diego, CA (US); Thomas E. Virgil, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 355 days.

(21) Appl. No.: 13/214,305

(22) Filed: Aug. 22, 2011

(65) Prior Publication Data

US 2012/0054378 A1    Mar. 1, 2012

Related U.S. Application Data

(60) Provisional application No. 61/378,159, filed on Aug. 30, 2010.

(51) Int. Cl.
G06F 3/00 (2006.01)
G06F 5/00 (2006.01)
G06F 13/42 (2006.01)

(52) U.S. Cl.
CPC .................................. *G06F 13/4295* (2013.01)
USPC .................................. 710/19; 710/10; 710/41

(58) Field of Classification Search
None
See application file for complete search history.

(56) References Cited

U.S. PATENT DOCUMENTS

| 6,862,643 | B2 | 3/2005 | Wu et al. |
| 6,976,105 | B1 | 12/2005 | Wright |
| 7,577,776 | B2 | 8/2009 | Hsueh |
| 2007/0088967 | A1* | 4/2007 | Fu et al. ........................ 713/340 |
| 2009/0217304 | A1 | 8/2009 | Shih et al. |
| 2010/0138564 | A1 | 6/2010 | Lee et al. |

FOREIGN PATENT DOCUMENTS

| JP | 2002185548 A | 6/2002 |
| JP | 2008146419 A | 6/2008 |
| JP | 2010140269 A | 6/2010 |
| WO | 2009125586 A1 | 10/2009 |

OTHER PUBLICATIONS

DON: "Universal Serial Bus system architecture", 2001, pp. 80-83, Adison Wesley, XP002662720, ISBN: 0201309750.
International Search Report and Written Opinion—PCT/US2011/049750—ISA/EPO—Nov. 15, 2011.

* cited by examiner

*Primary Examiner* — Zachary K Huson
(74) *Attorney, Agent, or Firm* — Nicholas J. Pauley; Peter Michael Kamarchik; Joseph Agusta

(57) ABSTRACT

A system for implementing a virtual Universal Serial Bus (USB) compound device with a simulated hub enables a single physical USB device, such as a USB peripheral device, to expose multiple stand-alone functions on the USB bus. Logical functions on the single physical USB device can be added and removed dynamically without re-enumerating the entire device and without affecting the state of other functions. Logical functions can also be independently implemented on any of a number of processors in a system that has access to the USB hardware. Each processor can enumerate as one or more USB devices via the virtual hub. Initialization of logical functions can be performed via the virtual USB hub to maintain a charging current level from a USB host in a device having a discharged battery.

23 Claims, 6 Drawing Sheets

VIRTUAL USB COMPOUND DEVICE ENUMERATION

CROSS REFERENCE TO RELATED APPLICATION

The present application claims the benefit of U.S. Provisional Patent Application No. 61/378,159 to MALAMANT et al. filed Aug. 30, 2010.

FIELD

Aspects of the present disclosure relate generally to Universal Serial Bus (USB) devices and more particularly to enumeration of a virtual USB device.

BACKGROUND

Universal Serial Bus (USB) hosts such as USB host personal computers (PC hosts) are designed to enable plug-and-play operation of a number of USB peripheral devices. That is, the USB peripheral devices are automatically configured for communicating with the USB host when they are physically connected to a USB port of the USB host. USB hosts may be capable of handling up to 127 USB peripheral devices and may provide mechanisms for dynamically loading and unloading drivers for each device attached on a USB bus.

Unlike USB hosts, USB peripheral devices are generally unable to dynamically load and unload drivers for various USB functionalities. Rather, the USB peripheral devices enumerate a predefined static set of functions to the USB host when they are physically connected to the USB host. The set of static functions generally may not be extended in run-time. Certain newer USB peripheral devices may be capable of multiple USB functionalities. However, such devices may only have a limited ability to configure desired functionalities due to the inability of USB peripheral devices to dynamically load and unload USB drivers for the functionalities.

Certain composite USB devices may allow multiple USB functions to enumerate to a USB host on a single USB port. USB specifications describe certain methods for designing such composite devices by allowing the devices to enumerate with multiple functions on a single USB port.

FIG. 1 shows a USB descriptor hierarchy 100 that can represent multiple logical functions within a device in accordance with USB specifications. At least three stages of USB enumeration may occur when a USB device is plugged in to a host. A device descriptor 102 represents a USB enumeration for a device. A number of configuration descriptors 104 represent USB enumeration for various configurations of the device. A number of interface descriptors 106 may each represent a USB enumeration for a corresponding one of the USB functionalities. A number of endpoint descriptors 108 enumerate assignments for data channels to a particular interface. The endpoint descriptors 108 allow a particular functionality to access specific data channels in order to transfer data back and forth to the USB host, for example.

Because the descriptor hierarchy 100 shown in FIG. 1 is static, additional interfaces generally may not be added to the hierarchy unless a physical disconnection and reconnection of the device occurs or is simulated. Certain USB devices allow reconfiguration of a descriptor hierarchy 100 by internally opening and closing USB circuitry connecting the USB device to the USB host to simulate disconnection and reconnection of the USB device from/to the USB host. However, this method is often susceptible to errors due to disconnection and reconnection of all logical interfaces, which can tear down active application sessions in an unexpected manner.

Opening and closing USB circuitry to allow re-enumeration of USB functionality may also be problematic, for example, in the process of charging a dead battery of a USB peripheral device. According to the USB specification, a USB peripheral device may draw up to 100 mA from a USB host before the USB peripheral device enumerates and may request up to 500 mA from the USB host after the USB peripheral device enumerates. However, a USB peripheral device may have to draw more than 100 mA to load its operating system. To recover from a discharged battery, a USB device may enumerate to a USB host early in a boot loading process. The initial enumeration may occur before loading the USB peripheral operating system and may use only up to 100 mA of current.

To further conserve power during a boot process with a discharged battery, a USB peripheral device may initially enumerate as a simpler USB peripheral device, such as a USB human interface device (HID) Class device, for example. After the initial enumeration of the USB peripheral device is complete, the USB peripheral device may request up to 500 mA from the USB host. The additional current may be used to finish loading the USB peripheral's operating system. Once the operating system is loaded, the USB peripheral device will generally re-enumerate to represent its actual functionalities to the USB host as specified by the operating system.

A re-enumeration may be performed by opening and closing USB circuitry to simulate a reconnection of the USB device as described above. However, the USB specification would then mandate reducing the charging current from around 500 mA to a pre-enumeration level of less than 100 mA. Therefore, opening and closing the USB circuitry to re-enumerate the USB device functionally can not be performed in a USB compliant manner until the battery is sufficiently charged.

Simulating disconnection/reconnection of a USB peripheral device may also cause other undesirable side effects. For example, the naming of hardware ports in certain operating systems may be automatically updated when the operating system recognizes a physical disconnection/reconnection of a USB device. This may cause errors in processes that are accessing renamed ports.

USB specifications define a method of packaging multiple USB devices within a single compound device package with an embedded USB hub. An example of a compound device including an embedded USB hub is described with reference to FIG. 2. A root hub 202 may be connected directly to a USB host 204 and a number of USB devices 206 may be connected to the USB host 204 via the root hub 202. A number of additional devices 208 may be connected to the root hub 202 via a number of additional USB hubs 210. Certain compound devices may include a USB hub 210 having one or more connected USB devices 208.

Connecting a USB device to a USB host via one or more USB hubs may solve some of the problems associated with recharging a USB device described above. Because the USB hub is a comparatively simple device, it may enumerate during an initial boot loading process without a re-enumeration step. After its initial enumeration, the USB hub can increase its current draw from the USB host from less than 100 mA to about 500 mA and may keep drawing 500 mA until the battery is charged. The current draw of up to 500 mA may be maintained even as devices are added and removed from the configuration via the USB hub.

Even though devices such as USB hubs may enumerate multiple functions on a single USB port, such functions are statically defined and may not be changed in run-time. Moreover, USB host operating systems may have multiple specifications or limitations that may restrict the USB host's interactions with such composite USB devices. Proprietary drivers may be developed for composite devices with these operating system limitations in which dedicated product identifies (IDs) may be assigned for each possible combination of logical functions, for example.

Efforts to provide dynamically configurable USB functionality on USB peripheral devices have included implementing composite drivers in the primary processor of the USB peripheral device. However, such composite drivers have been inherently limited because they manage all combinations of possible USB functionalities and assign a separated product ID for each combination. Some implementations define a product ID for a super set of functions known at the time of system design and enumerate with a subset of the functions based on the specific scenario. In either case, adding a new USB functionality is complex and involves re-enumeration of all functions.

Dedicated USB hub chips have been added to USB peripheral devices for compound device implementation. Compound USB hub devices that have one or more downstream ports exposed in addition to certain embedded USB functions are also available in the market. One example of such a compound device is shown in FIG. 3. The device 300 shown in FIG. 3 is an example of a USB compound hub with SD card slots 302 and an embedded card reader function. USB compound devices can handle multiple independent functions hosted on different processors. However, USB compound devices involve extra cost and extra power consumption on independent physical USB interfaces to each processor. In addition, each processor attached to the embedded USB hub chip still has the same limitations as those of a stand alone USB device.

On certain multi-processor systems with a single USB port, such as a micro-B port or a micro-AB port, for example, each processor may expose certain USB functionality to the USB bus. The multiple USB functionalities have been exposed by hosting the corresponding USB drivers on a single primary processor. This may be inefficient because, for example, other processors in the multi-processor systems, i.e., secondary processors, may be subject to an increased burden of additional processing to communicate with USB hardware via a primary processor.

SUMMARY

According to aspects of the present disclosure, virtual USB hub functionality can be invoked to allow a second device functionality enumeration to occur without reducing the charging current level. Invoking the virtual USB hub functionality can be performed by devices with low battery power so they may continue to draw high level current from a host for rapid recharging while at the same time enumerating a second device functionality. The device performs an initial enumeration at a low current level as a virtual hub, requests a higher current level for charging and then may maintain the high current level while enumerating the second functionality via the virtual hub.

Aspects of the present disclosure provide a method including enumerating a Universal Serial Bus (USB) peripheral device as a virtual hub using a low current draw from a USB host and requesting a high current draw from the USB host while the USB peripheral device is being enumerated as the virtual hub. The method further includes sending a port status change notification to the USB host and enumerating a second USB functionality of the USB peripheral device via the virtual hub using the high current draw.

Aspects of the present disclosure also provide an apparatus including means for enumerating a Universal Serial Bus (USB) peripheral device as a virtual hub using a low current draw from a USB host and means for requesting a high current draw from the USB host while the USB peripheral device is being enumerated as the virtual hub. The apparatus also includes means for sending a port status change notification to the USB host, and means for enumerating a second USB functionality of the USB peripheral device via the virtual hub using the high current draw.

Aspects of the present disclosure also provide a computer product for wireless communication in a wireless network. The computer product includes a computer-readable medium with program code stored thereon. The program code includes code for enumerating a Universal Serial Bus (USB) peripheral device as a virtual hub using a low current draw from a USB host and means for requesting a high current draw from the USB host while the USB peripheral device is being enumerated as the virtual hub. The program code further includes program code to send a port status change notification to the USB host. The program code also includes code for enumerating a second USB functionality of the USB peripheral device via the virtual hub using the high current draw.

Aspects of the present disclosure also provide an apparatus for wireless communication including a memory and at least one processor coupled to the memory. The processor(s) is/are configured to enumerate a Universal Serial Bus (USB) peripheral device as a virtual hub using a low current draw from a USB host and to request a high current draw from the USB host while the USB peripheral device is being enumerated as the virtual hub. The processor(s) is/are also configured to send a port status change notification to the USB host and to enumerate a second USB functionality of the USB peripheral device via the virtual hub using the high current draw.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present teachings, reference is now made to the following description taken in conjunction with the accompanying drawings.

DETAILED DESCRIPTION

Figure 1:
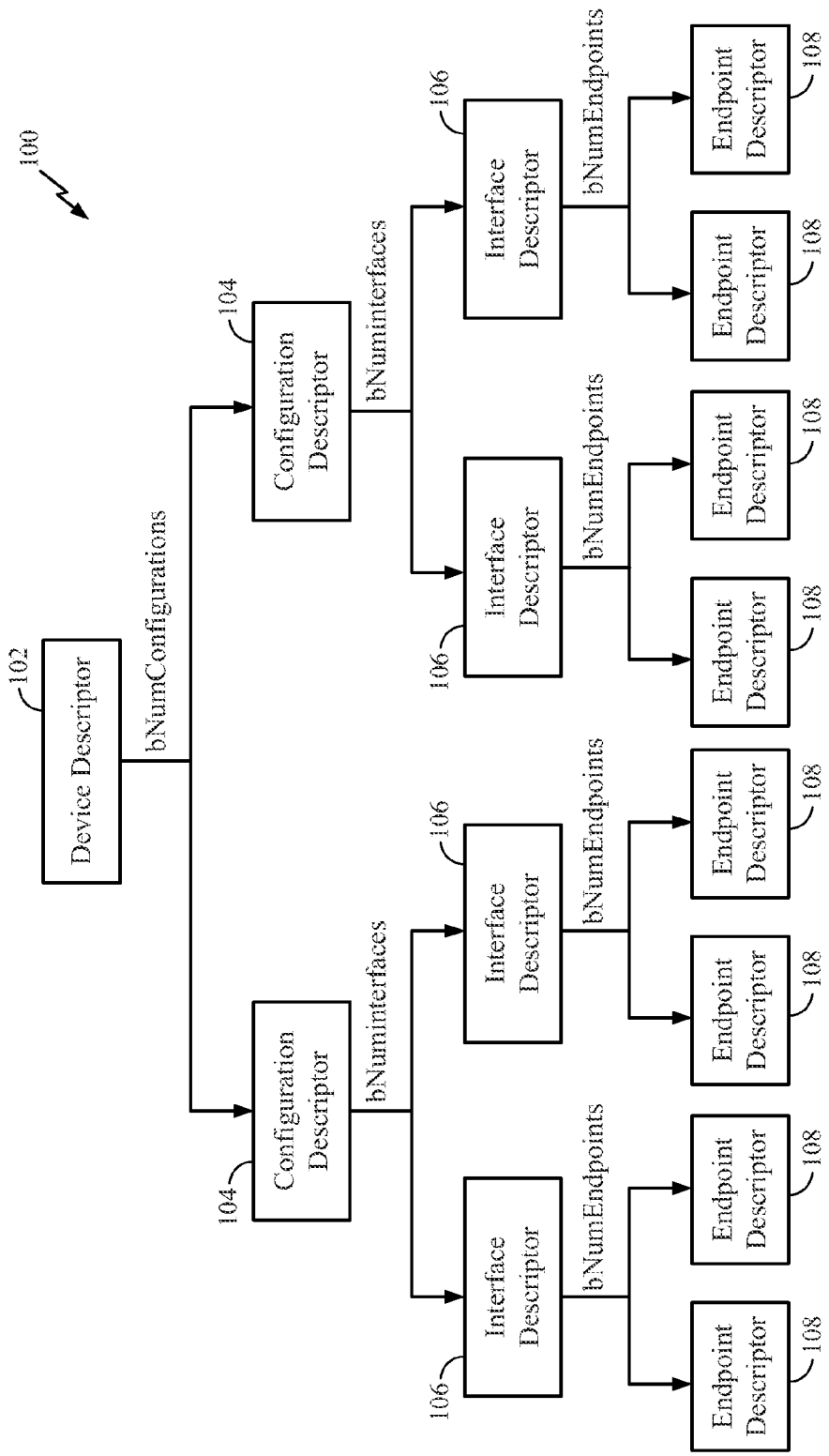
FIG. 1 is a block diagram conceptually illustrating a Universal Serial Bus (USB) descriptor hierarchy according to the PRIOR ART.
Figure 2:
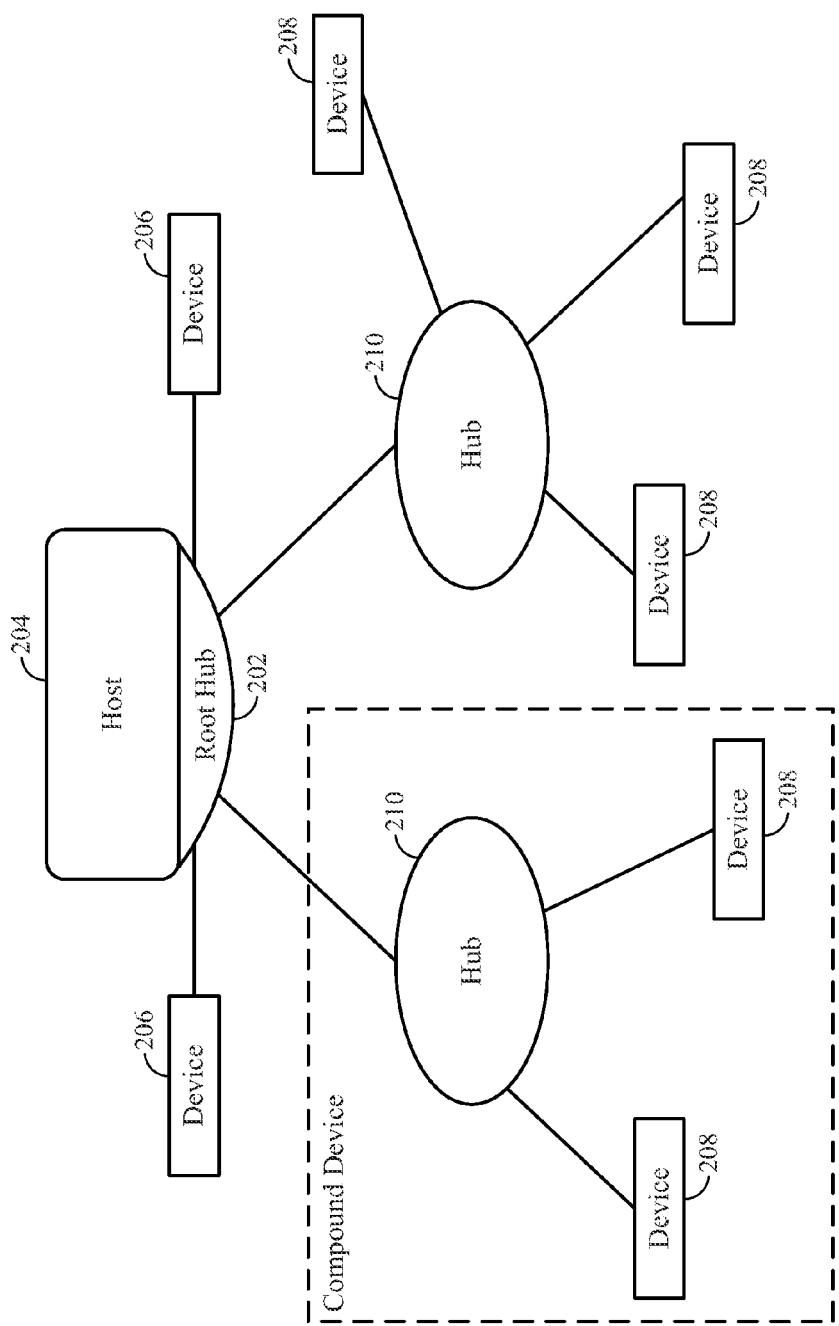
FIG. 2 is a block diagram conceptually illustrating a Universal Serial Bus (USB) compound device configuration according to the PRIOR ART.
Figure 3:
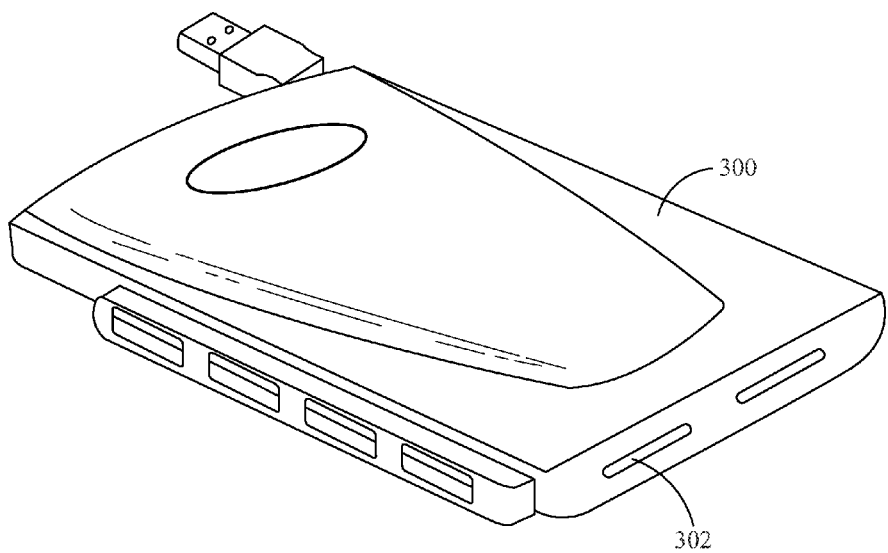
FIG. 3 is an illustration of a Universal Serial Bus (USB) compound device according to the PRIOR ART.

Aspects of the present disclosure provide a system and method of combining multiple logical Universal Serial Bus (USB) functional entities within a single device. According to aspects of the present disclosure, a USB peripheral device such as a smart phone, for example, may expose multiple USB functions to a USB host to access various systems of the host. Examples of such systems include:

Mass storage systems that provide direct access to embedded storage devices;

Multi-media Transfer Protocol (MTP) systems that enable transfer of media files, including media protected by Digital Rights Management (DRM) from a USB host to a peripheral and vice versa;

Tethered networking systems that provide cellular network connectivity to a laptop host;

Debug systems that enable phone diagnostic commands, logging, console, etc.; and Video systems that stream video from an embedded broadcast TV receiver.

Aspects of the present disclosure provide a system for implementing a virtual compound device with a simulated hub. The system enables a single physical USB device, such as a USB peripheral device, for example, to expose multiple stand-alone functions on the USB bus. According to aspects of the present disclosure, logical functions on the single physical USB device can be added and removed dynamically without having to re-enumerate the entire device and without affecting the state of other functions. Logical functions can also be independently implemented on any of a number of processors in the system that has access to the USB hardware. Each processor can enumerate as one or more USB devices via the virtual hub. Initialization of logical functions can be deferred until a processor and its operating system are initialized or until the logical function itself is initialized.

According to aspects of the present disclosure, by using a virtual hub, a system can enumerate as a USB hub upon power-up time, reset time or boot time and immediately commence charging. A second device function enumeration can be deferred until later in the operation of the system.

A reduction of charging current during re-enumeration is specified by USB standards. According to aspects of the present disclosure, virtual USB hub functionality can be invoked to allow the second device functionality enumeration to occur without reducing the charging current level requested as part of the device's initial enumeration. The second device function enumeration may not be possible with a reduced current level from the host when the device has low battery power. Invoking the virtual USB hub functionality according to aspects of the present disclosure can be performed by devices with low battery power to draw high level current from a host for rapid recharging while at the same time enumerating a device functionality that may draw a high current level. The device performs an initial enumeration at a low current level as a virtual hub, requests a higher current level for charging and then may maintain the high current level while enumerating the second functionality via the virtual hub.

According to an aspect of the disclosure, the virtual USB functionality may be optionally invoked by a device in response to determining the device has a discharged battery or a battery charge level below a predetermined threshold. If the battery is not discharged below a predetermined level, the device may perform its initial enumeration directly without invoking a virtual hub functionality to reduce the total enumeration time.

Figure 4:
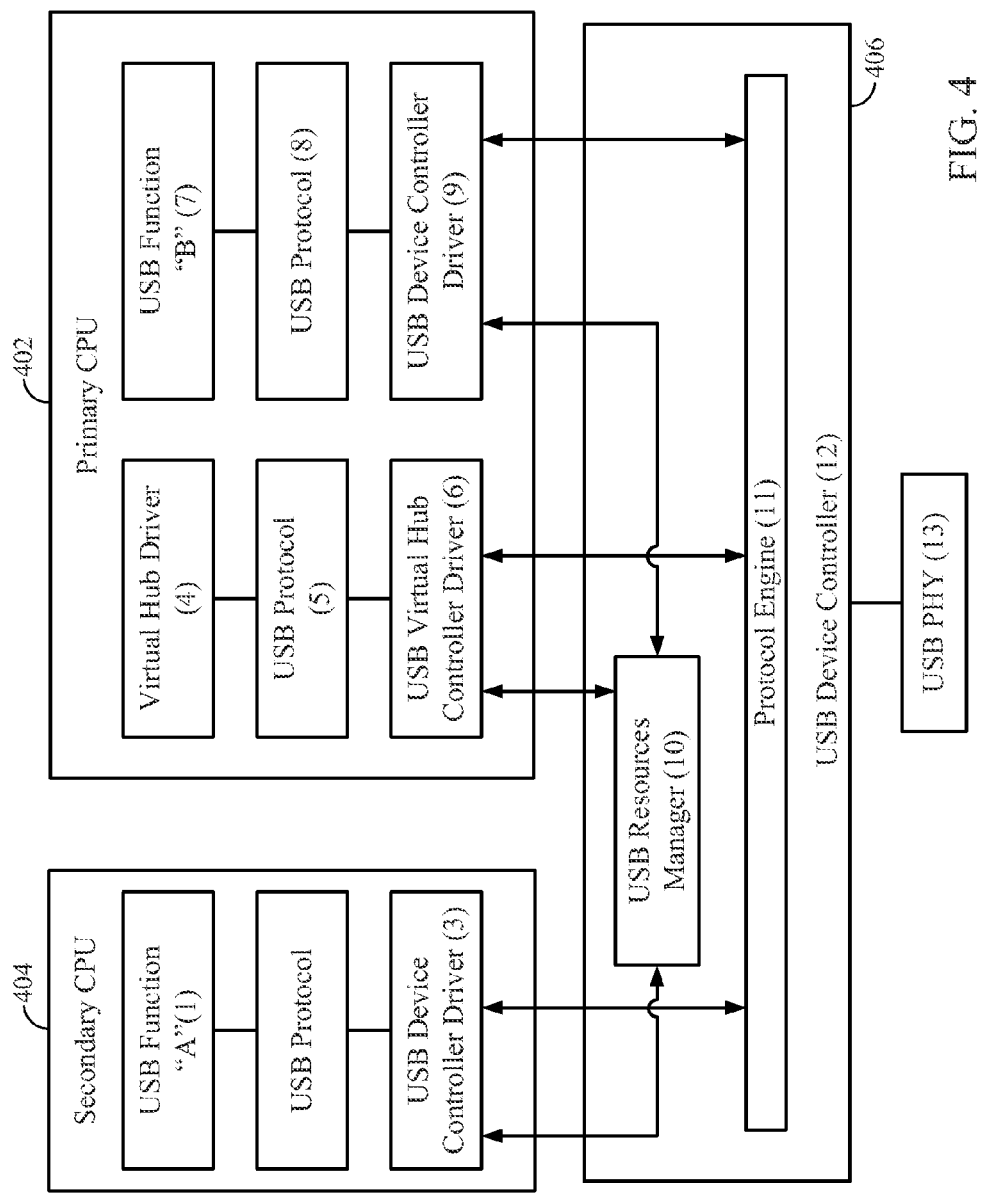
FIG. 4 is a block diagram conceptually illustrating a Virtual Universal Serial Bus (USB) hub according to an aspect of the present disclosure.

A virtual hub architecture according to an illustrative embodiment of the present disclosure is described with reference to FIG. 4. Building blocks of the architecture include:

USB Function "A" (1) and USB Function "B" (7) are logical USB functional software entities, such as "USB Mass Storage driver" or "Dial-up Networking driver", for example.

USB Protocol (2), (5), and (8) are instances of a software implementation of a generic USB protocol that includes procedures for device enumeration, preparing various USB descriptors, and handling USB transfers over control/bulk/interrupt/isochronous endpoints.

USB Device Controller Driver (3) and (9) are instances of a device driver that provides access to the USB device controller hardware for managing low level procedures, such as allocating endpoint hardware resources, handling USB interrupts, initiating data receive/transmit procedures, etc.

The USB Virtual Hub Controller Driver (6) extends the USB Device Controller Driver (3) and (9); adding an initial initialization of the USB Device Controller (12) hardware and managing hub-specific functionality, such as handling connect/disconnect requests from the USB Resources Manager (10).

The USB Resources Manager (10) is a hardware block that manages allocation of hardware endpoint resources for every virtual device. It is also responsible for notifying the USB Virtual Hub Controller Driver (6) when virtual devices are enabled or disabled and this enables the virtual hub to simulate port connect/disconnect events to the USB host.

The Protocol Engine (11) handles USB hardware logic, including endpoint management, packet transfers, and interfacing with the software drivers via interrupts and registers.

The USB Device Controller (12) encapsulates USB digital hardware blocks, excluding USB physical layer hardware.

The USB PHY (13) encapsulates all USB physical layer hardware blocks.

A virtual hub device according to aspects of the present disclosure logically combines downstream ports and their connections to device functions in a single system package without exposing external downstream facing USB ports.

The USB hardware controller, according to aspects of the present disclosure, simulates hub behavior rather than including actual hub hardware in the design. Each one of the logical functions, e.g. USB Function "A" or USB Function "B" on either of the primary processor 402 or secondary processor 404 can connect to the USB hardware 406 directly and request resources as if it were a stand alone device. For example, USB Function "A" could be a mass storage function and USB Function "B" could be some diagnostic capability. Each one of the USB functions appears to the USB host as if it were a stand alone device connected to the USB host via a USB hub.

According to aspects of the present disclosure, the secondary processor 404 may be a modem processor, for example, and the primary processor 402 may be an application processor, for example. Blocks 4, 5 and 6 are the components related to the virtual hub driver. The Virtual hub driver 4 may be a software component that handles all of the hub specific requests coming from the USB host.

In the discharged battery case described above, aspects of the present disclosure may enable a hub functionality such that it will seem to the USB host that a hub was enabled. Later, the virtual USB device may enable the operating system and may enumerate actual functionalities, such as a storage functionality, for example. According to this example, enumeration of the storage functionality would seem to the USB host as if someone just plugged in a storage device behind the hub on one of the hub ports.

According to aspects of the present disclosure, when a specific logical entity such as USB Function "A" is ready to enumerate, commands are sent to the USB device controller 12 to allocate endpoint resources and to request a connection. When it requests to connect, the hardware 406 raises an interrupt to the virtual hub driver 4. In response to the interrupt, the virtual hub driver 4 signals the USB host that it has something new connected on one of its ports. This replaces the physical handling of connection events with a logical handling of connection events using an enhanced version of the USB hardware.

According to aspects of the present disclosure, multiple CPUs may operate as though they are interacting with the USB controller. For example, when multiple CPUs want to allocate resources, they can do so in the same manner as in previous designs. When multiple CPUs want to connect, they may write certain registers requesting a connection as they usually would. The logic of the virtual hub is hidden from the multiple CPUs in the protocol engine 11. The USB Resources Manager 10 handles the allocation of end point resources. Some of the hub logic may be implemented in the Virtual Hub Driver 4.

Figure 5:
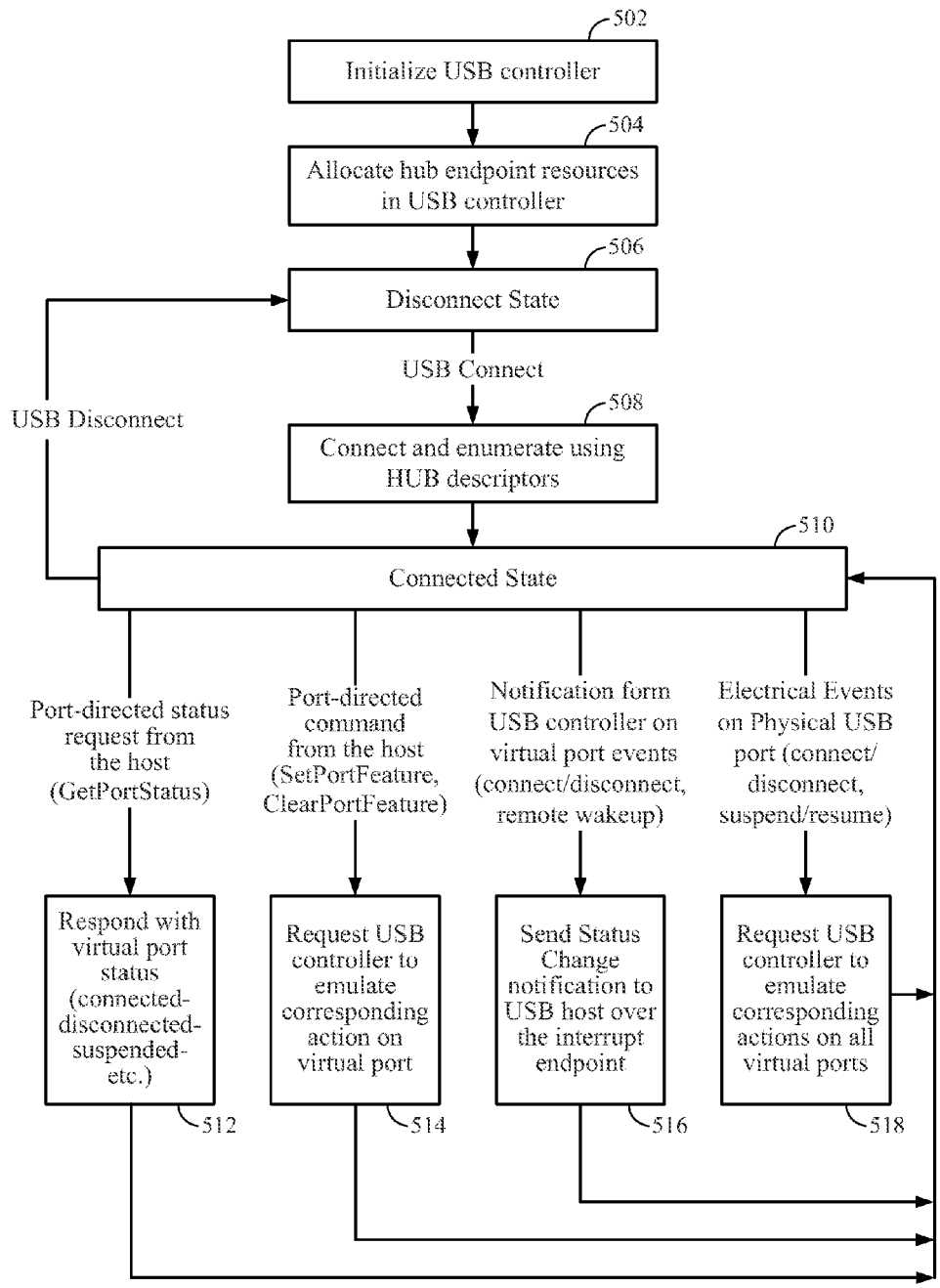
FIG. 5 is a block diagram illustrating a Virtual Universal Serial Bus (USB) hub process according to an aspect of the present disclosure.

A process for providing virtual hub functionality according to an aspect of the disclosure is described with reference to FIG. 5. The process starts with initializing the USB controller in block 502 and allocating the endpoints for the hub itself in block 504. Then in block 506, the virtual hub goes into a disconnected state until a USB cable is connected to the device, for example. After the USB cable is connected, the hub devices are enumerated using the appropriate hub descriptors in block 508. The device then transitions into a connected state in block 510. In response to a USB disconnect, the devices returns to the disconnected state (block 506)

In the connected state, specific actions are taken in response to corresponding events. The virtual hub may receive a port-directed status request from the USB host, for example. In block 512, the virtual hub may respond to the host by reporting status of the various ports. This response may inform the host whether a port is connected, disconnected or suspended, for example. The virtual hub may receive a port-directed command from the host, to set port features or clear port features, for example. In block 514, the virtual hub may respond to the request by requesting the USB controller to emulate a corresponding action on a corresponding virtual port. The virtual hub may receive a notification from the USB controller regarding virtual port events, such as a connect/disconnect event or a remote wakeup event, for example. In block 516, the virtual hub may respond to the notification by sending a status change notification to the USB host over an interrupt endpoint. The virtual hub may recognize certain electrical events on the physical USB port, such as a connect/disconnect event or a suspend/resume event, for example. In block 518, the virtual hub may respond to the electrical events by requesting the USB controller to emulate corresponding actions on all virtual ports. After any of these actions, the device returns to the connected state (block 510).

Figure 6:
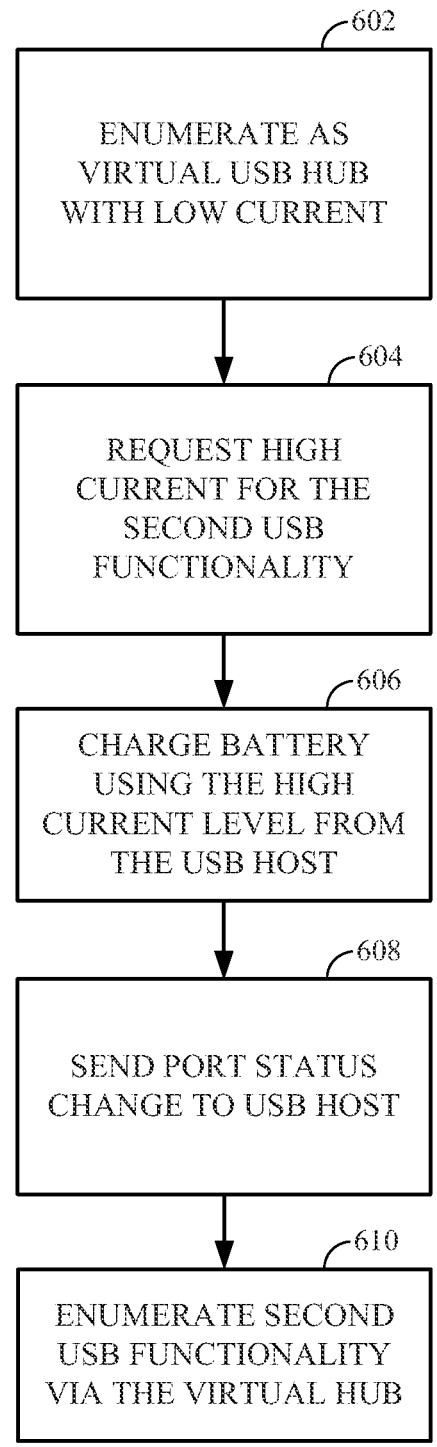
FIG. 6 is a block diagram illustrating a process for charging a discharged battery of a Universal Serial Bus (USB) peripheral device using a Virtual USB hub according to an aspect of the present disclosure.

A process for charging a discharged battery of a USB peripheral device using virtual hub functionality according to an aspect of the disclosure is described with reference to FIG. 6. The process executes in response to standard protocol commands. In block 602 the USB host enumerates a USB peripheral device as a virtual hub using a low current draw from the USB host. The virtual USB hub enumerates with low current (<100 mA), but in block 604 during the process of enumeration, the virtual USB hub requests high current (500 mA) to be granted following the enumeration. This provides enough power to load the secondary USB function and enumerate it behind the USB bus. In block 606 the process includes charging a discharged battery of the USB peripheral device with at least a portion of the high current draw. In block 608, the peripheral device sends a port status change to the USB host. In block 610, the process includes enumerating a second USB functionality of the USB peripheral device via the virtual hub. The battery charging in block 606 can start immediately after the virtual USB hub is enumerated and before loading the secondary USB function in block 608.

Aspects of the present disclosure allow decentralized management of USB functions and allow a USB host to operate using simple USB drivers. New logical entities on a USB peripheral device may be easily combined with previous configurations.

According to standard USB architectures, each USB peripheral device may be assigned a particular address. When a device is first physically connected to a USB port of a USB host, USB host software sends a command to assign a port address to that device. Each USB peripheral device has generally been associated with a single device address. Aspects of the present disclosure simulate a hub which can have multiple USB devices attached to it. A USB controller is redesigned to handle multiple USB device addresses by adding an additional level of "device address" to transaction routing, for example.

A USB 2.0 bus is a broadcast bus in which each message that a USB host sends on the USB bus includes a device address. The messages are generally communicated to all of the USB peripheral devices connected to the USB bus. The USB hardware of a connected USB peripheral device looks at the device address included with each broadcast command to determine whether the command is associated with its own device address. The USB device can then process commands addressed to itself and ignore others. According to the present disclosure, the USB device hardware controller may compare the device address of a message with multiple different addresses that are associated with different logical entities. A USB resource manager coordinates First In First Out (FIFO) allocation requests from multiple logical drivers associated with the multiple logical entities. A USB hub driver generates connect/disconnect/remote-wakeup notifications to the host based on requests from the logical functions.

Aspects of the present disclosure decouple logical functions so that USB devices do not have to accommodate every possible permutation of functionality configurations. Logical functions can be independently loaded and unloaded in real time without affecting other logical functions. This enables simplified deployment of numerous applications to USB devices such as smart phones, for example. Software applications and functionality may therefore utilize a level of extendibility on a USB device that has previously only been available on a USB host.

According to aspects of the present disclosure, multiple logical functions may be hosted on different CPUs without using Inter-Process Communication (IPC). This enables a high data rate on a USB peripheral device such as a USB modem, for example. Such high data rates may be used in LTE devices, for example.

Certain device designs include a physical USB hub in the device to enable both a modem and application processor to concurrently communicate with a USB host. This allows data sent at a high data rate by the modem processor to go directly to the USB hardware without first passing through an application processor. The virtual USB hub according to aspects of the present disclosure can reduce the cost size and power consumption of a device, such as an LTE modem, by simulating the USB hub with a combination of hardware and software.

FIG. 7 is a block diagram showing an exemplary wireless communication system 700 in which an aspect of the disclosure may be advantageously employed. For purposes of illustration, FIG. 7 shows three remote units 720, 730, and 750 and two base stations 740. It will be recognized that wireless communication systems may have many more remote units and base stations. Remote units 720, 730, and 750 include IC devices 725A, 725C and 725B that include the disclosed virtual USB compound device. It will be recognized that other devices may also include the disclosed virtual USB compound device, such as the base stations, switching devices, and network equipment. FIG. 7 shows forward link signals 780 from the base station 740 to the remote units 720, 730, and 750 and reverse link signals 790 from the remote units 720, 730, and 750 to base stations 740.

In FIG. 7, remote unit 720 is shown as a mobile telephone, remote unit 730 is shown as a portable computer, and remote unit 750 is shown as a fixed location remote unit in a wireless local loop system. For example, the remote units may be mobile phones, tablets, hand-held personal communication systems (PCS) units, portable data units such as personal data assistants, GPS enabled devices, navigation devices, set top boxes, music players, video players, entertainment units, fixed location data units such as meter reading equipment, or any other device that stores or retrieves data or computer instructions, or any combination thereof. Although FIG. 7 illustrates remote units according to the teachings of the disclosure, the disclosure is not limited to these exemplary illustrated units. Aspects of the disclosure may be suitably employed in any device which includes a virtual USB compound device.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

According to aspects of the present disclosure, apparatus may have means for enumerating a USB peripheral device as a virtual hub using a low current draw from a USB host, means for requesting a high current draw from the USB host, and means for enumerating a second USB functionality of the USB peripheral device via the virtual hub using the high current draw. In one aspect, the aforementioned means may be the primary processor 402, secondary processor 404 and the USB hardware 406 shown in FIG. 4, for example. In another aspect, the aforementioned means may be a module or any apparatus configured to perform the functions recited by the aforementioned means.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although specific circuitry has been set forth, it will be appreciated by those skilled in the art that not all of the disclosed circuitry is required to practice the disclosure. Moreover, certain well known circuits have not been described, to maintain focus on the disclosure.

Although the present disclosure and its advantages have been described in detail, it should be understood that various changes, substitutions and alterations can be made herein without departing from the technology of the disclosure as defined by the appended claims. For example, relational terms, such as "above" and "below" are used with respect to a substrate or electronic device. Of course, if the substrate or electronic device is inverted, above becomes below, and vice versa. Additionally, if oriented sideways, above and below may refer to sides of a substrate or electronic device. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein. Accordingly, the appended claims are intended to include within their scope such processes, machines, manufacture, compositions of matter, means, methods, or steps.

What is claimed is:

1. A method comprising:
   enumerating a Universal Serial Bus (USB) peripheral device as a virtual hub using a low current draw from a USB host, the USB peripheral device not including a physical USB hub;
   requesting a high current draw from the USB host, while the USB peripheral device is being enumerated as the virtual hub;
   sending a status change notification to the USB host; and
   enumerating a second USB functionality of the USB peripheral device via the virtual hub using the high current draw.

2. The method of claim 1, further comprising:
   charging an at least partially discharged battery of the USB peripheral device with at least a portion of the high current draw.

3. The method of claim 2, further comprising:
   identifying the at least partially discharged battery state of the USB peripheral device; and
   performing the enumeration as the virtual hub in response to detecting the at least partially discharged battery state.

4. The method of claim 2, further comprising:
   determining if the at least partially discharged battery of the USB peripheral device is sufficiently charged to perform a boot routine of the second USB functionality with the low current draw from the USB host; and
   performing the enumeration of the second USB functionality directly to the USB host in response to determining the at least partially discharged battery is sufficiently charged.

5. The method of claim 1, further comprising:
   loading an operating system of the second USB functionality using at least a portion of the high current draw.

6. The method of claim 1, further comprising:
   receiving a USB interface communication from the second USB functionality; and
   simulating one of a port connection event and a port disconnection event to the USB host, in response to receiving the USB interface communication.

7. The method of claim 1, further comprising:
   integrating the USB peripheral device into at least one of a mobile phone, a set top box, a music player, a video player, an entertainment unit, a navigation device, a computer, a hand-held personal communication systems (PCS) unit, a portable data unit, and a fixed location data unit.

8. An apparatus comprising:
- means for enumerating a Universal Serial Bus (USB) peripheral device as a virtual hub using a low current draw from a USB host, the USB peripheral device not including a physical USB hub;
- means for requesting a high current draw from the USB host, while the USB peripheral device is being enumerated as the virtual hub;
- means for sending a port status change notification to the USB host; and
- means for enumerating a second USB functionality of the USB peripheral device via the virtual hub using the high current draw.

9. The apparatus of claim 8, integrated into at least one of a mobile phone, a set top box, a music player, a video player, an entertainment unit, a navigation device, a computer, a hand-held personal communication systems (PCS) unit, a portable data unit, and a fixed location data unit.

10. A computer program product for wireless communications in a wireless network, comprising:
- a computer-readable medium having non-transitory program code recorded thereon, the program code comprising:
  - program code to enumerate a Universal Serial Bus (USB) peripheral device as a virtual hub using a low current draw from a USB host, the USB peripheral device not including a physical USB hub;
  - program code to request a high current draw from the USB host, while the USB peripheral device is being enumerated as the virtual hub;
- program code to send a port status change notification to the USB host; and
- program code to enumerate a second USB functionality of the USB peripheral device via the virtual hub using the high current draw.

11. The computer program product of claim 10, in which the program code further comprises:
- program code to charge an at least partially discharged battery of the USB peripheral device with at least a portion of the high current draw.

12. The computer program product of claim 11, in which the program code further comprises:
- program code to identify the at east partially discharged battery state of the USB peripheral device; and
- program code to perform the enumeration as the virtual hub in response to detecting the at least partially discharged battery state.

13. The computer program product claim 11, in which the program code further comprises:
- program code to determine if the at least partially discharged battery of the USB peripheral device is sufficiently charged to perform a boot routine of the second USB functionality with the tow current draw from the USB host; and
- program code to perform the enumeration of the second USB functionality directly to the USB host in response to determining the at least partially discharged battery is sufficiently charged.

14. The computer program product of claim 10, in which the program code further comprises:
- program code to load an operating system of the second USB functionality using at least a portion of the high current draw.

15. The computer program product of claim 10, in which the program code further comprises:
- program code to receive a USB interface communication from the second USB functionality; and
- program code to simulate one of a port connection event and a port disconnection event to the USB host, in response to receiving the USB interface communication.

16. The computer program product of claim 10, integrated into at least one of a mobile phone, a set top box, a music player, a video player, an entertainment unit, a navigation device, a computer, a hand-held personal communication systems (PCS) unit, a portable data unit, and a fixed location data unit.

17. An apparatus for wireless communication, comprising:
- a memory; and
- at least one processor coupled to the memory, the at least one processor being configured:
  - to enumerate a Universal Serial Bus (USB) peripheral device as a virtual hub using a low current draw from a USB host, the USB peripheral device not including a physical USB hub;
  - to request a high current draw from the USB host, while the USB peripheral device is being enumerated as the virtual hub;
  - to send a port status change notification to the USB host; and
  - to enumerate a second USB functionality of the USB peripheral device via the virtual hub using the high current draw.

18. The apparatus of claim 17, in which the at least one processor is further configured
- to charge an at least partially discharged battery of the USB peripheral device with at least a portion of the high current draw.

19. The apparatus of claim 18, in which the at least one processor is further configured:
- to identify the at least partially discharged battery state of the USB peripheral device; and
- to perform the enumeration as the virtual hub in response to detecting the at least partially discharged battery state.

20. The apparatus of claim 18, in which the at least one processor is further configured:
- to determine if the at least partially discharged battery of the USB peripheral device is sufficiently charged to perform a boot routine of the second USB functionality with the low current draw from the USB host; and
- to perform the enumeration of the second USB functionality directly to the USB host in response to determining the at least partially discharged battery is sufficiently charged.

21. The apparatus of claim 17, in which the at least one processor is further configured:
- to load an operating system oldie second USB functionality using at least a portion of the high current draw.

22. The apparatus of claim 17, in which the at least one processor is further configured:
- to receive a USB interface communication from the second USB functionality; and
- to simulate one of a port connection event and a port disconnection event to the USB host, in response to receiving the USB interface communication.

23. The apparatus of claim 17, integrated into at least one of a mobile phone, a set top box, a music player, a video player, an entertainment unit, a navigation device, a computer, a hand-held personal communication systems (PCS) unit, a portable data unit, and a fixed location data unit.

* * * * *